United States Patent [19]

Seeger

[11] Patent Number: 4,746,440
[45] Date of Patent: May 24, 1988

[54] PROCESS AND APPARATUS FOR THE SEPARATION OF EMULSIONS OR OF SOLIDS FROM A SUSPENSION OF SOLIDS AND A LIQUID BY MEANS OF PRESSURE OR TURBO FLOTATION

[75] Inventor: Hanspeter Seeger, Dottingen, Fed. Rep. of Germany

[73] Assignee: Ystral GmbH, Ballrechten-Dottingen, Fed. Rep. of Germany

[21] Appl. No.: 906,634

[22] Filed: Sep. 10, 1986

Related U.S. Application Data

[63] Continuation of Ser. No. 662,184, Oct. 18, 1984, abandoned.

[30] Foreign Application Priority Data

Oct. 20, 1983 [DE] Fed. Rep. of Germany ....... 3338171

[51] Int. Cl.$^4$ ............................................. B01D 17/04
[52] U.S. Cl. ........................................ 210/703; 55/45; 55/46; 55/76; 55/178; 209/169; 210/704; 210/708; 210/718; 210/188; 210/218; 210/219; 210/221.1; 261/87
[58] Field of Search .................... 55/45, 46, 74, 178, 55/76; 209/169; 210/703–706, 710, 718, 787, 188, 218, 219, 222.1, 708; 261/87, 93

[56] References Cited

U.S. PATENT DOCUMENTS

| 2,436,375 | 2/1948 | Booth et al. ............... | 210/703 |
| 2,730,190 | 1/1956 | Brown et al. .............. | 55/45 |
| 2,780,360 | 2/1957 | Bon et al. .................. | 210/703 |

(List continued on next page.)

FOREIGN PATENT DOCUMENTS

| 1023881 | 1/1978 | Canada ..................... 210/221.1 |
| 1269071 | 5/1968 | Fed. Rep. of Germany . |
| 1294301 | 5/1969 | Fed. Rep. of Germany . |
| 2055961 | 5/1972 | Fed. Rep. of Germany . |
| 2839758 | 1/1980 | Fed. Rep. of Germany . |
| 2408277 | 7/1979 | France .................... 210/219 |

OTHER PUBLICATIONS

Brochure of the Company, "Denver Equipment", of 1947.

"Aufbereitung fester mineralischer Rohstoffe", FEB, Deutscher Verlag fur Grundstoffe, 1967, pp. 388–389.
"Gluckauf", 1977, No. 10, p. 953, bottom of 2nd column.

(List continued on next page.)

Primary Examiner—Peter Hruskoci
Attorney, Agent, or Firm—Wood, Dalton, Phillips, Mason & Rowe

[57] ABSTRACT

A process and an apparatus are specified by which emulsions or suspensions of both different and changing composition can be separated in a particularly reliable manner. Proceeding on the principle of turbo-flotation, which is known per se, according to one embodiment, the gas is dispersed in the lower region of the vessel so that it is finely dispersed directly at the point where the emulsion is broken up or the suspension is separated, respectively, mechanically. Furthermore, the emulsion or suspension to be separated is supplied to the vessel close to the surface of the emulsion and the residue is removed at the bottom of the vessel. In this way, in continuous operation, a counter-flow between gas or gas/liquid suspension and emulsion can be achieved, thereby avoiding recontamination and re-emulsification. A strictly separated turbulence zone and a superposed flotation zone are formed. Foam carrying the flotate is formed on the surface. When the vessel is contructed so that it is closed, according to a second embodiment the foam can be forced without any mechanical means to a separating device through the effect of the rising gas, in which reliable separation is possible into solids and waste gases, and also into residual water which may be recycled. Flocculation and/or flotation chemicals can advantageously be supplied to the emulsion or suspension in the vessel in the region of the turbulence zone. In addition to a continuous process, in which several vessels are arranged in series and have a continuous flow running through them, a batch or cyclic process is also possible, in which the emulsion or suspension is left in the vessel until complete separation has taken place, and the separation of other substances may be carried out with the aid of other chemicals and/or of other gases in further vessels or a further separation stage.

17 Claims, 4 Drawing Sheets

U.S. PATENT DOCUMENTS

| | | | |
|---|---|---|---|
| 3,109,722 | 11/1963 | Dow | 55/76 |
| 3,393,802 | 7/1968 | Logue et al. | 209/169 |
| 3,468,794 | 9/1969 | Amero | 210/608 |
| 3,716,480 | 2/1973 | Finley et al. | 55/45 |
| 3,884,803 | 5/1975 | Traylor | 210/704 |
| 4,017,391 | 4/1977 | Black | 210/705 |
| 4,161,444 | 7/1979 | Moore | 209/169 |
| 4,193,949 | 3/1980 | Naito | 210/219 |
| 4,265,739 | 5/1981 | Dalton | 209/169 |

OTHER PUBLICATIONS

"Die wirtschaftliche Anwendung der Flotaton mit sehr kleinen Luftblasen zur Reinigung von Abswassern", by B. Harnisch, (1960), pp. 69–72.

"Arbeitsweise und erste Ergebnisse der WEMCO-Anlagen zur Klarung von EinpreBwassern in Erdolfeldern", by G. Heschl et al., *Erdol–Erdgas–Zeitschrift*, Mar. 1983, pp. 82–86.

PROCESS AND APPARATUS FOR THE SEPARATION OF EMULSIONS OR OF SOLIDS FROM A SUSPENSION OF SOLIDS AND A LIQUID BY MEANS OF PRESSURE OR TURBO FLOTATION

This application is a continuation of application Ser. No. 662,184 filed Oct. 18, 1984, now abandoned.

TECHNICAL FIELD OF THE INVENTION

The purification of industrial waste waters of all kinds is becoming increasingly important. Before industrial waste waters can be fed to conventional sewage treatment plants, it is therefore necessary to remove from the waste waters harmful substances which cannot be purified by the former. Waste waters from industrial installations, refineries and also from abattoirs, or the like, must therefore be processed, i.e. must be rid of such substances as can no longer be purified by conventional sewage treatment plants. The harmful substances yielded must be yielded so that they are processed in such a way that their subsequent treatment, be it ultimate waste disposal, be it subsequent processing for other purposes, is possible. Pressure and turbo for rotation flotation constitutes such a process.

BRIEF DESCRIPTION OF THE PRIOR ART

Such a process and an apparatus appropriate therefor is known, for example, for the treatment of waste waters containing crude oil (cf., for example, Erdöl-Erdgas-Zeitschrift, 99 (March 1983) (pp. 82–89). In this, in the first instance the composition of the emulsion or suspension is determined, any solids already present are precipitated, and chemicals which already produce flocculation or sedimentation may be added. The emulsion or suspension, thus conditioned, is then fed to a flotation device which essentially comprises an oblong trough in which several gasifying devices are arranged. Each gasifying device draws by suction the emulsion or suspension from the bottom of the trough and mixes it with gas, for example air, supplied from above. The mixer divides the gas into small bubbles and mixes these into the liquid. A mixer hood above the mixer encloses its rotor and forces the two-phase mixture of the gas and the emulsion or suspension through apertures. Transverse turbulences are produced which cause the emulsion or suspension to be more intimately mixed with gas bubbles. The substances of the emulsion or suspension which are to separated are deposited on the gas bubbles and are taken to the surface in the vessel by means of the gas bubbles, thereby producing a foam phase. This is termed flotation, the so-called flotate being deposited on the foam. The foam phase is skimmed to the side into lateral foam vessels by means of clearing devices which are rotating, paddle-like devices. There, the foam with the substances to be separated can undergo subsequent treatment or can be kept ready for subsequent treatment.

On the other hand it is quite common to break up an emulsion or to separate a suspension, respectively, to remove harmful substances using chemical, physical, thermical or mechanical processes, a flotation process being one of those mechanical processes (cf., for example, Chemische Rundschau, (1981) No. 44 and 45). However combining process for flotation and for breaking up emulsions (or separating suspensions, respectively) poses a lot of great problems which seems hard to overcome.

With such emulsions or suspensions for example, fluctuating composition of the emulsion or suspension added is very critical. More particularly, with frequently changing composition, as occurs with waste disposal operations, great problems, in particular with regard to time, arise when the process is implemented as continous processing is impossible. With other waste waters such as those from abattoirs or food enterprises, there is also flotation of harmful substances which, at least with a rise in temperature, cause a considerable odor problem. A further essential disadvantage of the conventional process and apparatus is the fact that foams are extremely difficult to deal with, and it is for this reason that stabilizing agents are frequently added in order to stabilize the foams. However, in any case, careful handling is required. If, in fact, handling is not careful enough, there may be re-emulsification and it has been found that re-emulsified emulsions are substantially more difficult to break up than the original emulsion. Such a re-emulsion may be produced when undissolved or non-emulsified particles reach that region of the vessel in which turbulence is produced for mechanical separation. Unstable emulsions which have been broken up are namely present there. The known apparatus also has the disadvantage that the emulsion passes through the base zone of the vessel and is able to flow from one base zone to the next. As it flows through, waste water which has already undergone preliminary purification in one zone may reach the next base zone and may continue to contaminate this anew. Moreover, the air bubbles do not travel vertically but onwards because of the flow through the whole trough and take considerably longer to rise to the surface. It has become apparent, however, that it is a matter not of as long a residence time as possible, but rather of the number of air bubbles. However, this can be made to be high only if the bubbles travel through the emulsion or suspension at a fast rate, thereby quickly making space for new bubbles.

OBJECT OF THE INVENTION

The object of the invention, therefore, is to improve, a process and an apparatus of the afore-mentioned kind so that despite simple construction, the separating action is clearly intensified.

BRIEF DESCRIPTION OF THE INVENTION

It is essential that, on the one hand, the gas is mixed in very finely, and namely directly at the point where the emulsion is broken up mechanically or the suspension is separated. Furthermore, it is essential that the emulsion is added close to the surface of the emulsion in the vessel, and that the residual phase is discharged at the bottom of the vessel so that the gas bubbles move vertically, i.e. the shortest way, through the emulsion or suspension. In a continuous process in which the emulsion or suspension passes through vessels, arranged in series, of substantially the same design, the emulsion or suspension and the gas bubbles move in reverse flow, whereby there is flotation of all of the undissolved or non-emulsified particles before they arrive at the turbulence zone of the vessel, so that the emulsion breaking up (or suspension separating) process in the turbulence zone may not be disrupted. However, batch operation with a corresponding residence time is also possible. Here it is a further advantage that flotation can take place in the various vessels relative to different constituents of the emulsion or suspension. As is known, the flotation process is aided by flotation chemicals which are matched to the substances which are to undergo flotation; therefore, it is equally important to be able to supply different flotation chemicals to the various vessels. Furthermore, different gases can also be supplied should chemical reactions otherwise be feared. Furthermore, flocculation chemicals may also first be supplied to the vessels.

A further important feature of the invention is that the vessels can be designed so that they are in themselves closed, whereby the foam forming on the surface of the emulsion or suspension can be carried out of the vessel via a line by the gas bubbles pushing behind, without the need for mechanical action on the foam which might trigger re-emulsification. The foam and flotate removed can then be separated, for example, in a centrifuge or the like, into solids, waste gas and, if necessary, residual water wich has been carried along. The solid material can then undergo subsequent treatment and processing in the normal manner. Depending on the emulsion or suspension, subsequent treatment and processing is carried out for the purpose of subsequent combustion, subsequent waste disposal as special waste or even for subsequent feed. Depending on its composition the waste gas from flotation may be released directly into the atmosphere. If, however, the waste gas contains harmful substances, then these can be removed in a manner in itself conventional. If, for example, the waste gas contains substances which have an offensive odor, such as chlorinated hydrocarbons, then advantageously the waste gas is passed through an appropriate filter such as an activated carbon filter. As it is highly probable that it contains impurities, the residual water separated in the separating device is returned to the start of the process and to the apparatus inlet, i.e. it is added to the emulsion to be supplied.

A further advantage of the sealed vessel may be seen in the fact that it can be used in conjunction with a vehicle, i.e. the process according to the invention can even be used on ships on which an open process is unsuitable, since ship vibrations or changes in position would immediately disturb the skimming process, thereby rendering the apparatus inoperative.

It has also become apparent that through intensive aeration in several stages a substantial reduction in the CSB-5-value and also great oxygen enrichment is possible, thereby eliminating dangers due to dead water or to the introduction of corresponding waste waters.

BRIEF DESCRIPTION OF THE DRAWINGS

The invention is described in greater detail by way of the exemplary embodiments represented in the drawing.

DETAILED DESCRIPTION OF THE INVENTION

The invention is described in greater detail in the following with reference to a process and to an apparatus for removing (flotating and breaking up) of emulsions. However, the process and apparatus according to the invention are equally suitable for the separation of solids from a suspension of solids and a liquid.

Furthermore, the invention is described in greater detail with reference to an embodiment in which water is used as liquid and air is used as gas; however, it can relate to other gases and/or liquids also, the type of gas being dependent on the type of liquid and on the substances emulsified therein.

Figure 1:
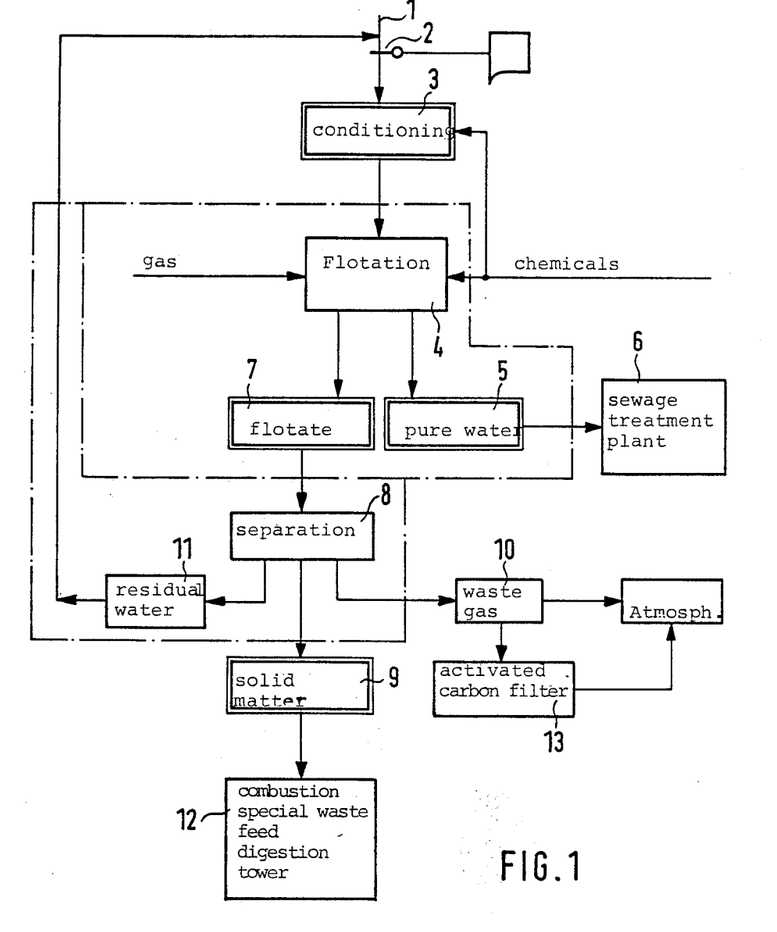
FIG. 1 shows a flow chart of the process according to the invention, for removing emulsions.

An emulsion, its composition unknown in the first instance, is supplied via a supply line 1. Those properties of the emulsion which are essential for the process are determined and recorded with the aid of measuring devices 2 known per se. In particular, the chemical composition of the emulsion supplied is determined in respect of the liquid and of the essential substances. In addition, for example the pH value, the temperature and the like are determined.

Subject to the now known composition of the emulsion, the latter is conditioned in a conditioning stage 3; this means that chemicals which enable particles of substances to be removed, for example by flocculation, precipitation or the like are added. After the precipitated or flocculated cpnstituents have been skimmed off, the emulsion, thus conditioned, is supplied to a flotation stage 4 which is described in greater detail below. The flotation stage 4 produces, on the one hand, pure water 5 which is supplied to a conventional purifying arrangement as a treatment plant 6, should this be necessary, for example, to comply with legal regulations. Furthermore, flotate or foam 7 is produced and is supplied to a separation stage 8, for example a centrifuge or the like, as is described in greater detail below. In the separation stage 8 the foam 7 is separated into solid matter 9, waste gas 10 and, possibly, residual water 11 still contained in the foam 7. The solid matter 9 is supplied to a subsequent, conventional process 12 known per se, such as combustion, ultimate waste disposal as special waste, feed or the like, depending on the composition of the solid matter 9. Depending on its composition, the waste gas 10 from flotation is released into the atmosphere, directly or via an appropriate filter device 13. As the residual water 11, at least in part, still contains the inlet side emulsion, it is returned to the supply line 1 again and undergoes the process anew.

Figure 2:
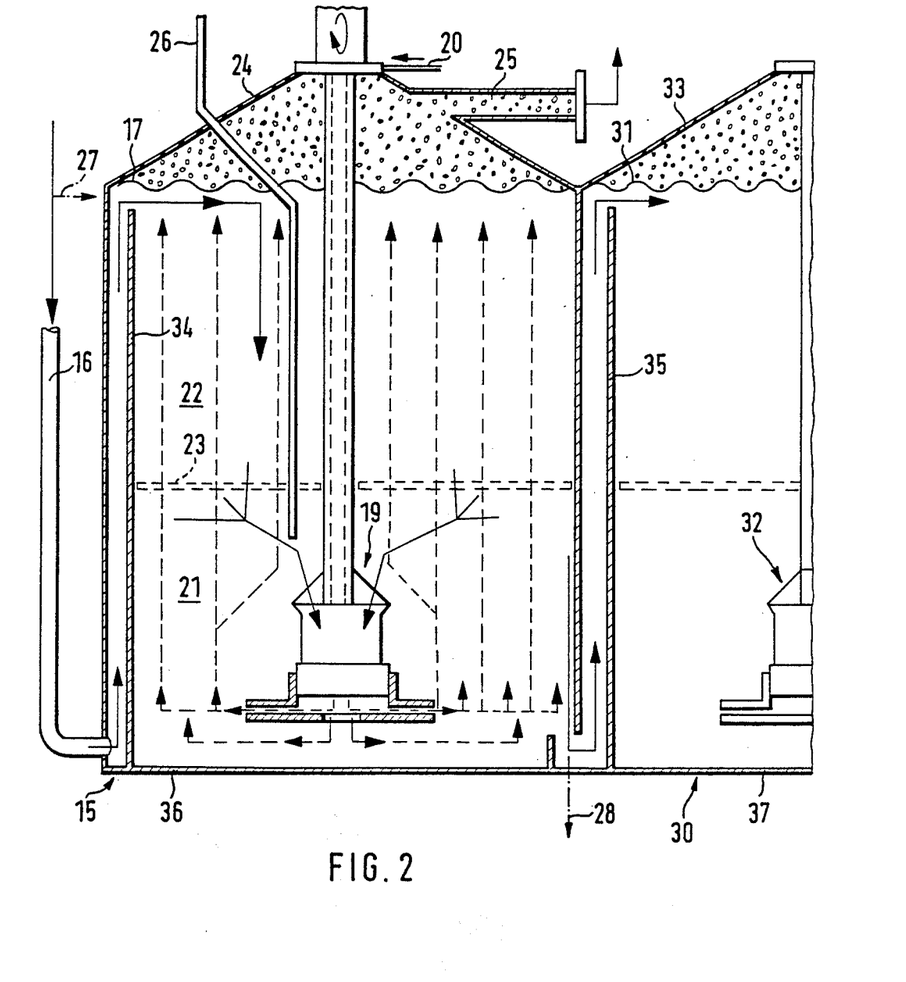
FIG. 2 shows a diagrammatic, sectional of the essential features of the apparatus according to the invention, for removing emulsions.

FIG. 2 shows a diagrammatic, sectional view of a first vessel 15 through which the flow passes in the flotation stage 4 according to FIG. 1. The (conditioned) emulsion is supplied to the vessel 15 via a line 16. The latter opens out into the vessel 15 so that the emulsion is supplied at the top of the vessel 15 close to but slightly below the surface 17 of the emulsion in the vessel. The vessel 15 has on the other side an outlet 18 which is disposed at the bottom of the vessel 15. The emulsion, therefore, flows in accordance with the solid line arrows substantially vertically from top to bottom. There is arranged in the vessel 15 substantially centrally between the inlet to the line 16 and the outlet 18 from the vessel 15 a gasifying device 19 by means of which the gas supplied via a line 20 can be passed to the lower region of the vessel 15 and can be mixed into the emulsion in the vessel 15 so that it is finely dispersed. Furthermore, the gasifying device 19 is designed so that turbulence is produced in the emulsion, a device also being provided by means of which the emulsion is broken up mechanically on the basis of impact forces or the like, an extremely finely dispersed gas being mixed in at the same time. An exemplary embodiment of a gasifying device 19 suitable for this purpose will be described in greater detail below with reference to FIGS. 3 and 4. As shown by broken lines, the gas bubbles, having a small diameter and issuing from the gasifying device 19, rise upwards in a substantially vertical direction, thus in reverse flow to the emulsion. As shown, the emulsion, still unbroken, enters the gasifying device 19 and mixes with the minute gas bubbles, being broken up mechanically as it leaves the gasifying device 19. A gas/liquid suspension is formed. Two distinct zones may be distinguished in the vessel 15. The two zones, namely the turbulence and gasifying zone 21 formed in the lower region and the flotation zone 22, described in greater detail below, formed in the upper region, may be separated one from the other by a grid 23, represented by broken lines, for better separation of the two zones. In the flotation zone 22 all the solids are attached to the surface of the gas bubbles, in particular, substances in the flotation zone can be attached to the surface of the gas bubbles, which otherwise might produce re-emulsification in the turbulence zone. The gas bubbles, forming a foam 7 with flotate, arrive at the surface 17 of the emulsion in the vessel 15. The vessel 15 is sealed by means of a cover 24 having substantially the shape of a truncated cone here, from which an outlet line 25 leads to the separation stage 8 according to FIG. 1. The gas bubbles, constantly pushing from behind, force the foam 7 and the flotate to move out of the area between cover 24 and surface 17 into the line 25 and hence to the separation stage 8. Mechanical skimming or the like which might disturb the sensitive foam and might possibly also cause re-emulsification is thereby effectively avoided.

Furthermore, a chemical line 26, through which the flocculation and/or flotation chemicals may be mixed, more particularly into the turbulence zone 21, passes into the vessel 15. As already mentioned, flocculation chemicals may also be supplied to the conditioning stage 3. As will be explained later, the supply of flocculation chemicals to the individual vessels may be advantageous.

Apparatus so designed can be used for batch operation and for continuous operation; specific designs of the vessel itself may be advantageous for the one or the other application.

In batch operation, as represented by a dot-dash line 27, the pipeline 16 can advantageously open out at the top of the vessel 15. Furthermore, in the same way, as is represented likewise by a dot-dash line 28, the pure water (5 in FIG. 1) formed during batch operation can be discharged, for example, via a pipeline or the like. In batch operation the emulsion remains in the vessel 15 until the separation of the emulsion is at an end, noticeable by the fact that the substances to be separated are no longer attached to the foam which is forming (for example the foam is white and is no longer darkened by contaminants). If necessary, separation of the emulsion could then be carried out in respect of another substance by introducing another gas and/or other chemicals. If the basic composition of the emulsion is known and is substantially constant, then, by means of program control, the emulsion can be treated in a fully automatic manner in respect of all the substances to be separated.

FIG. 2, however, shows an apparatus for having substantially the same construction, are arranged in series. According to FIG. 2, a second vessel 30 adjoins the first vessel 15, which second vessel has substantially the same construction, namely a supply of emulsion close to the top of the second vessel 30, nevertheless below the surface 31 of the emulsion contained in the second vessel 30, and corresponding discharge at the bottom on the other side. Furthermore, the second vessel 30 likewise contains a gasifying device 32 and a cover 33 likewise having a foam outlet line. The foam discharged from the region of the cover 33 can be supplied to the same, or even to a different, separation device.

The connection between the two vessels 15 and 30 could be formed by pipelines. The design shown, however, makes possible a simple series arrangement of any number of vessels. For this purpose, one of the vessels has at its inlet or outlet end a partition wall 34 (1st vessel 15) and 35 (2nd vessel 30) respectively. In the embodiment shown, the partition walls 34 and 35 respectively are provided on the inlet side, i.e. beginning at the bottom 36 and 37 respectively of the respective vessel 15 and 30 respectively and ending at a distance from the respective surface 17 and 31 respectively of the emulsion contained in the respective vessel 15 and 30 respectively. This means that before it enters the flotation zone 22, the emulsion supplied to the container 15 and 30 respectively flows from bottom to top between the outside wall and the respective partition wall 34 and 35 respectively. This produces a smooth flow of emulsion (partially purified) flowing from the bottom of the first vessel 15 to the top of the second vessel 30 at its inlet side.

If all the vessels 15, 30 . . . of the apparatus are of essentially the same construction, then the emulsion supply line 16 to the first vessel is connected to the bottom thereof in such a way that the emulsion supplied flows first between the outside wall and the partition wall 34 up to the inlet at the top of the flotation zone 22 below the surface 17 of the emulsion in the vessel 15.

As already mentioned, it is important that in the turbulence zone, on the one hand the emulsion is broken up mechanically and, on the other hand, at the same time and at the same place the gas or air is mixed in so as to be extremely finely dispersed. In particular, the bubbles which are formed need to be extraordinarily small in order to produce large total surface areas. Advantageously, the diameter of the gas bubbles is less than 0.1 mm. This means that in that area in which the emulsion is broken up mechanically and, at the same time, the air bubbles are mixed in, a kind of mist forms.

Figure 3:
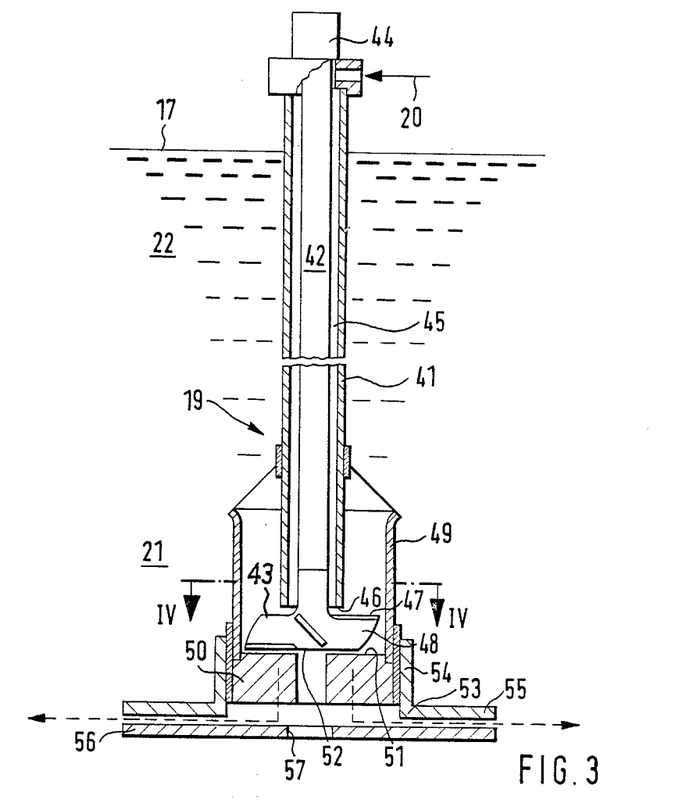
FIG. 3 shows a diagrammatic, sectional view of an advantageous development of the gasifying device.
Figure 4:
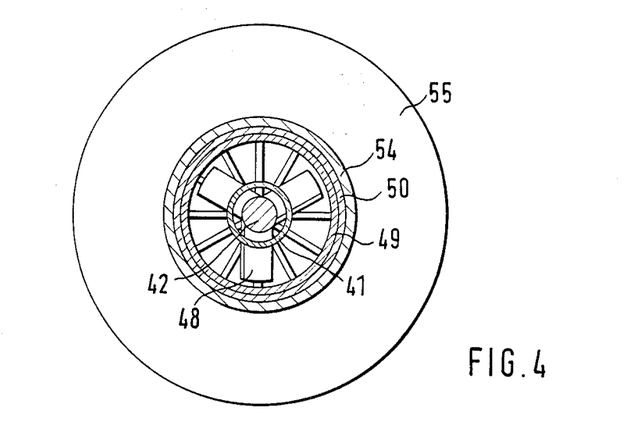
FIG. 4 shows the section IV—IV in FIG. 3.

An embodiment of a gasifying device 19 such as this is described in greater detail with reference to FIGS. 3 and 4, parts of the vessel 15 not being shown. Neither is there represented a support structure for the gasifying device 19 which also may be formed by the cover 24.

The gasifying device 19 has a stator pipe 41 and a rotor shaft 42 coaxial to this. A rotor 43 is secured to the bottom of the rotor shaft 42 outside the stator pipe 41 in a manner known per se. A drive motor 44 or another driving means is mounted, for example, flange-mounted in a manner known per se, on the other end of the rotor shaft 42. The gas line 20 opens into the space 45 between the rotor shaft 42 and the stator pipe 41. The bottom 46 of the stator pipe 41 ends at a short distance above the shear edges 47 of the blades 48 of the rotor 43. Stator pipe 41 and rotor 43 are encircled by a hollow, cylindrical stator 49, the stator 49 being mountable, fixedly or movably, on the stator pipe 41. The stator 49 carries at its lower end a dispersing element 50 which (cf. FIG. 4) is star-shaped, and there is a short distance between its upper edges 51 and the lower edges 52 of the blades 48 of the rotor 43. This distance can be adjusted by designing the dispersing element 50 so that it is vertically displaceable or adjustable relative to the stator 49. A pipe flange 53 is secured to the dispersing element 50 by way of its pipe section 54. A plate 56 having a center bore 57 is secured to this at a distance from the annular section 55. Pipe flange 53 and plate 56 form a flow element. The distance between the annular section 55 and the plate 56 can be adjustable. Their connection is only indicated; it may be formed by means of studs or the like. The gasifying device operates in the following manner. The emulsion is drawn in by a Venturi effect caused by the gas flowing out of the space 45, and of rotation of the rotor 43, and is mixed with the gas by fine dispersion of the gas at the dispersing element 50, and is released again by means of the flow element. Thus, at that moment at which, through the effect of shear and impact forces, agglomeration of the emulsion droplets commences, there is the simultaneous supply of very finely dispersed air so that, immediately, the agglomerate is charged with the gas and rises upwards.

Figure 5:
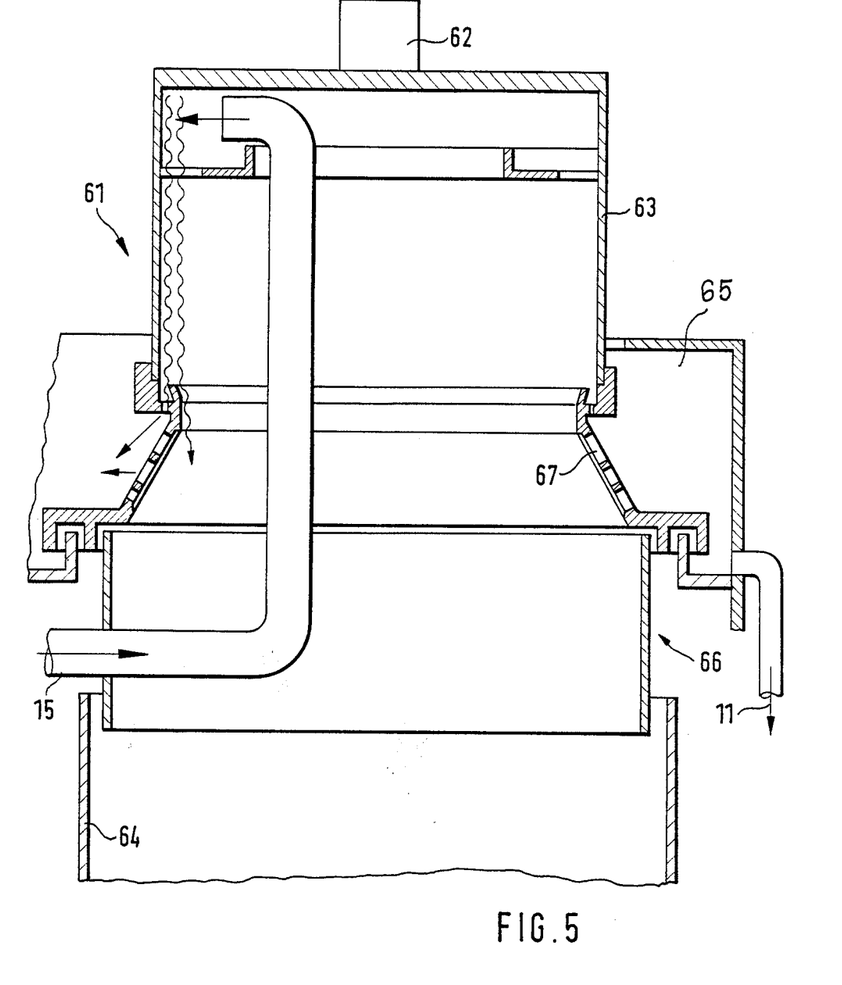
FIG. 5 shows a diagrammtic, sectional view of an example of a development of a centrifuge as separating device for the flotate.

FIG. 5 shows an embodiment of a separating device, namely a centrifuge 61, by means of which the foam, supplied via the line 15, and the flotate may be separated. The centrifuge has a first portion 63 which is rotated by means of a motor 62, the line 15 terminating close to the top of said portion. Liquid and solids are separated through centrifugal action, the solid matter falling into a solids receptacle 64. The liquid runs into a collecting chamber 65 and from there is discharged as residual water (FIG. 1). The solids receptacle 64 and the collecting chamber 65 are disposed in the fixed portion 66 of the centrifuge 61. There is provided above the solids receptacle 64 a sieve plate 67 through which the waste gas, i.e. gaseous constituents of the foam, issue, for example may enter the collecting chamber 65. The waste gases are discharged from this. If the waste gases are not harmful, they may be released immediately into the atmosphere. If the waste gases are corrosive, harmful to the environment or a nuisance, then they are collected and processed in a manner known per se. For example, waste gases containing chlorinated hydrocarbons which are a nuisance in terms of odor can be passed through an activated carbon filter.

To summarize, therefore, an emulsion is introduced via a supply line 1 into a vessel 15 incorporating a gasifying device 19 by means of which a gas is dispersed very finely into the emulsion in a manner dependent on speed. In conjunction with corresponding chemicals such as polymers, metallic salts, caustic soda etc., which may be supplied via the line 26, the emulsion is broken through the neutralization of electrical charge and through the application of shear forces which are able to coagulate the oil released by means of electrostatic processes or chemical processes (flocculation) and to act upon it with very small gas bubbles so that it is able to rise to the surface 17. This flotate forms, together with corresponding chemicals such as polymers, a foam 7 which is taken out automatically via the line 15 by the gas supplied and is supplied to a separating device. In the case of a continuous mode of operation with several vessels 15, 30 . . . in tandem, the apparatus operates in contra-flow, i.e. the emulsion is passed from vessel to vessel so that, in each case, it enters the vessel at the top and runs out of it at the bottom. All the solids are carried upwards by virtue of the lifting forces resulting from loading with the gas so that the concentration with solid matter increases the higher up the vessel it goes, in the same way as at the bottom of the vessel the lowest solids content (e.g. oil content) prevails. In continuous operation there is now a continuous supply of fresh, still unseparated emulsion which may still contain free oil and freely flotable solids. In the first instance, all those particles not present in a soluble or emulsified form are floated away. In the case of corresponding treatment with chemicals, before it enters the vessel, the emulsion may be already in the broken state when it is supplied to the vessel, thereby substantially accelerating flotation, as loose particles are carried immediately to the surface 17 and are no longer able to reach the turbulence zone 21, thereby preventing any re-emulsification. Rather, only emulsion which must first be broken by the shear forces and the forces of turbulence reaches the turbulence area 21. This, generally, is a matter only of very small amounts of oil or emulsifying agent which are unable to re-emulsify. The flotate is carried out immediately by the gas supplied so that no fresh substances may be drawn in from the flotate and/or supplied to the next vessel. Hence the gasifying device first succeeds in simultaneously introducing gas in order to produce a gas/liquid suspension and applying shear forces in order to separate and break up those parts of the emulsion which cannot be separated by chemical or electrostatic action alone. Furthermore, the gasifying device achieves total dispersion of such added chemicals as polymers or the like, if these have not already been supplied to the emulsion inlet but are measured directly into the turbulence zone 21 via the line 26. As mentioned, in each case different polymers or other chemicals can be added to the various vessels, i.e. in various successive cascade stages, in order thereby to separate other substances from the emulsion. The quantity and the type of chemicals added depends on the composition and on the structure of the respective emulsion as determined on the inlet side (measuring devices 2). The number of vessels to be used for continuous operation is also dependent on this. For example, for food stuffs four vessels are sufficient, for industrial washings two vessels suffice, for waste waters containing mineral oil, six vessels should be used.

An important advantage of the invention is that emulsions of the most varied composition can be broken and the flotate thus obtained can be separated. A discharge of pure water 5, meeting legal regulations, is therefore possible. Furthermore, as mentioned, with a completely closed form of construction, harmful substances, for example chlorinated hydrocarbons, contained in the waste gas flow can be removed. The counter-flow principle prevents emulsifying agents and oil particles and also solids from being carried over from one vessel to another in the case of emulsions which are difficult to separate. The purifying action is thereby improved although the whole installation is relatively small. Furthermore, the disadvantages resulting from mechanical skimming devices and discharge devices are effectively avoided. As the residual water can be supplied on the inlet side, the separation effect of the whole installation plays a subordinate role, as only the pure water is removed. This ensures that no particles from the flotate are able to reach the exterior. It is advantageous also that changes in level do not play an important role, as is the case with devices involving skimming. Nor is the concentration of flotate on the surface of the liquid which depends, inter alia, on the composition of the emulsion and the chemicals added, of great importance as is the case with skimming plant. It follows from this that the apparatus according to the invention is relatively insensitive to changing emulsions and is hence very flexible. Even in the case of heavily loaded emulsions, the foam with the dirt and the flotate can be discharged in the same way. Separation takes place in the separating device. Precisely during flotation, however, the particles of dirt are clearly lighter than the liquid surrounding them and, therefore, they form the innermost layer in the rotating portion, whereby the solids can be separated in a very reliable manner. The residual water flowing back already contains chemicals, whereby it can be ensured that the chemicals which are not consumed during flotation and which are precipitated on the flotate or in the residual water are recirculated. As a result, on the one hand, the chemical content of the flotate can be reduced and, on the other hand, chemicals can be saved in the whole process. This is particularly important if the solids are to be further worked up to form feed or fertilizer. This applies, more particularly, if the waste water has a high albumen content and flotation takes place exclusively by means of organic polymers.

The embodiment with a closed vessel ensures totally odor-free processing of waste waters, in particular from abattoirs, livestock commercialization operations etc., i.e. of waste waters which otherwise always result in odor problems for the environment above all at warmer times of the year. Furthermore, the closed construction is particularly appropriate for use on ships or similar vehicles in which an open apparatus is unsuitable, as with vibrations of the ship or changes in position, the foam-skimming process would be disturbed and hence the apparatus could no longer be operated.

The intensive aeration obtained in several stages in the continuous process ensures that there is a substantial reduction in the CSB-5 value and also considerable oxygen enrichment of waters that are in themselves dead. In the closed process, harmful gases such as chlorinated hydrocarbons, can be discharged and filtered out. Filtration of chlorinated hydrocarbons has the advantage that even if the plant malfunctions, the activated carbon filter can operate independently of the passage of the flow of liquid. Were the activated carbon filter to lie in the flow of liquid, then substantially more frequent regeneration would be necessary as otherwise the activated carbon filter would be blocked by the many extremely fine solids.

The apparatus is suitable for capacities of two m³/h to several hundred m³/h. Other particular advantages are the low operating costs and the simple construction of the apparatus which may be monitored and controlled at all times and in a simple manner, and more particularly, is readily adaptable to different oil or emulsion contents.

Other embodiments are, of course, possible.

What is claimed is:

1. An apparatus for separating oil from emulsions or solids from a suspension of solids and a liquid, by means of pressure or turbo-flotation,
comprising a vessel having an upper inlet to which an emulsion or suspension to be separated is supplied on the top side of said vessel close to the surface of said emulsion or suspension, and a lower outlet from which the residual phase of the emulsion or suspension is removed at or near the bottom side of said vessel, said upper inlet and said lower outlet being arranged to cause the emulsion or suspension to flow downwardly in said vessel, said vessel comprising a single gasifying device which disperses a gas counter-currently to downwardly flowing emulsion or suspension at a lower location within said vessel between said upper inlet and said lower outlet, said gasifying device including means for simultaneously mechanically breaking up said emulsion or separating asid suspension while said gas is dispensed, and an upper outlet for the removal of foam laden with the oil phase of said emulsion or with the solids of said suspension which foam is formed on the surface of said emulsion or suspension, said gasifying device having stator pipe, a rotor shaft coaxial to the stator pipe, a rotor at one end of the rotor shaft outside the stator pipe, a drive at the other end of the rotor shaft, a device for supplying said gas to the space between the rotor shaft and the stator pipe, and a hollow, cylindrical stator secured to the stator pipe, which encircles the rotor and the bottom of the stator pipe, a dispersing element and a flow element on said stator below said rotor so that said emulsion or said suspension is draw into said gas in parallel flow, the dispersion element and the flow element dispersing said gas therein and releasing said gas, finely dispersed, below the rotor.

2. An apparatus according to claim 1, wherein there is a slight space between the bottom of the stator pipe and the upper edges of the rotor blades of the rotor.

3. An apparatus according to claim 1, wherein the dispersing element is starshaped and there is a slight space between its upper edges and the lower edges of the rotor blades of the rotor.

4. An apparatus according to claim 1 wherein the flow element consists of a pipe flange secured to the stator pipe below the dispersing element, and of a plate, spaced above a gap, having a center aperture, the external diameter of both being greater than that of the stator.

5. A method of separating emulsions or liquid suspensions comprising:
(a) introducing the emulsion or suspension to be separated into a vessel through an upper inlet near the top of said vessel to attain a level of the emulsion or suspension in the vessel;
(b) mechanically separating the constituents of the emulsion or suspension while simultaneously introducing and dispersing a gas therein to form a foam, the introducing of said gas occurring within the vessel at a location substantially below said surface level and below the location at which step (a) is performed in said vessel so that said gas flows upwardly through said emulsion or suspension;
(c) removing the foam from the vessel at a location above said surface level; and
(d) removing liquid from the vessel at a location below that whereby step (b) is performed so that said emulsion or suspension flows downwardly in said vessel and in counter-current relation to said gas.

6. The method of claim 5 including the further step of repeating steps (a)–(d) inclusive at least once on the liquid resulting from the first performance of step (d).

7. The method of claim 5 wherein at least step (a) is performed continuously.

8. The method of claim 5 wherein at least step (a) is performed as a batch step.

9. The method of claim 5 performed on a series of said vessels and wherein steps (a)–(d) inclusive are repeated, the liquid removed from each performance of step (d) being utilized in the next subsequent performance of step (a) in the next succeeding vessel.

10. A method for separating emulsions or liquid suspensions comprising:
(a) introducing the emulsion or suspension to be separated into a closed vessel through an upper inlet new the top of said vessel whereby said emulsion or suspension attains a level within said vessel;
(b) mechanically separating the constituents of the emulsion or suspension while simultaneously introducing and dispersing a gas under pressure to form a foam, the introducing of said gas occurring within the vessel below the surface level of the emulsion or suspension therein and below the location of the performance of step (a) said gas flowing upwardly through said emulsion or suspension in said vessel to carry the foam toward an upper foam outlet;
(c) removing the foam from the vessel at said upper foam outlet by permitting the pressurized gas introduced during the performance of step (b) to pressurize the foam and drive the same out of the vessel through said upper outlet; and
(d) removing liquid from the vessel at a location below that whereat step (b) is performed so that said emulsion or suspension flows downwardly in said vessel and in countercurrent relation to said gas.

11. An apparatus according to claim 10, wherein said gasifying device includes means for dispersing gas bubbles having a diameter less than 0.1 mm.

12. Apparatus for separating emulsions or liquid suspensions comprising:
at least one vessel;
an upper inlet to said vessel near the top of said vessel introducing the emulsion or suspension into the vessel whereby said emulsion or suspension attains a level within said vessel, said inlet being subjacent the level of the emulsion or suspension in said vessel;
an upper, foam outlet from said vessel located above said level;
a lower, liquid outlet from said vessel located substantially below said inlet;
said inlet and said lower liquid outlet being arranged to cause the emulsion or suspension to flow downwardly in said vessel; and
mechanical means between said inlet and said lower outlet for mechanically breaking up and separating the constituents of the emulsion or suspension, and including a single gasifying device for simultaneously introducing and dispersing a gas within the emulsion or suspension being separated below said inlet so that said gas flows countercurrently to said downwardly flowing emulsion or suspension and forms a foam.

13. The apparatus of claim 12 further including a substantially horizontal separating grid in said vessel and located between said inlet and said mechanical means to define a turbulant zone below said grid and a substantially turbulance free zone above said grid.

14. An apparatus according to claim 12, including a plurality of vessels, each adapted to define a successive stage of the apparatus and further including means connecting the lower outlet of each vessel to the upper inlet of the vessel constituting the next successive stage.

15. An apparatus according to claim 14, wherein at least two vessels are arranged in series, and the adjoining areas have two substantially parallel dividing walls, one of which extends from the top to near the bottom the first vessel, and the other of which extends from the bottom to almost the surface at the top of the second vessel.

16. Apparatus for separating emulsions or liquid suspension comprising:
a closed vessel;
an upper inlet to said vessel near the top of said vessel for introducing the emulsion or suspension into the vessel;
an upper foam outlet from said vessel located above the intended level of emulsion or suspension in the vessel, said upper, foam outlet being free of mechanical means for advancing foam out of said vessel;
a lower liquid outlet from said vessel, said inlet and said lower outlet being arranged to cause the emulsion or suspension to flow downwardly in said vessel; and
mechanical means between said inlet and said liquid outlet for mechanically breaking up and separating the constituents of the emulsion or suspension, and including a gasifying device for simultaneously introducing and dispersing a gas within the emulsion or suspension being separated below said intended level to flow counter-currently to the emulsion or suspension and to form a foam, said gasifying device introducing said gas under pressure so that incoming gas pressures the foam out of said upper outlet.

17. The apparatus of claim 16 further including a separating device for receiving foam from said upper outlet, said separating device constituting a centrifuge.

* * * * *